Patented June 27, 1939

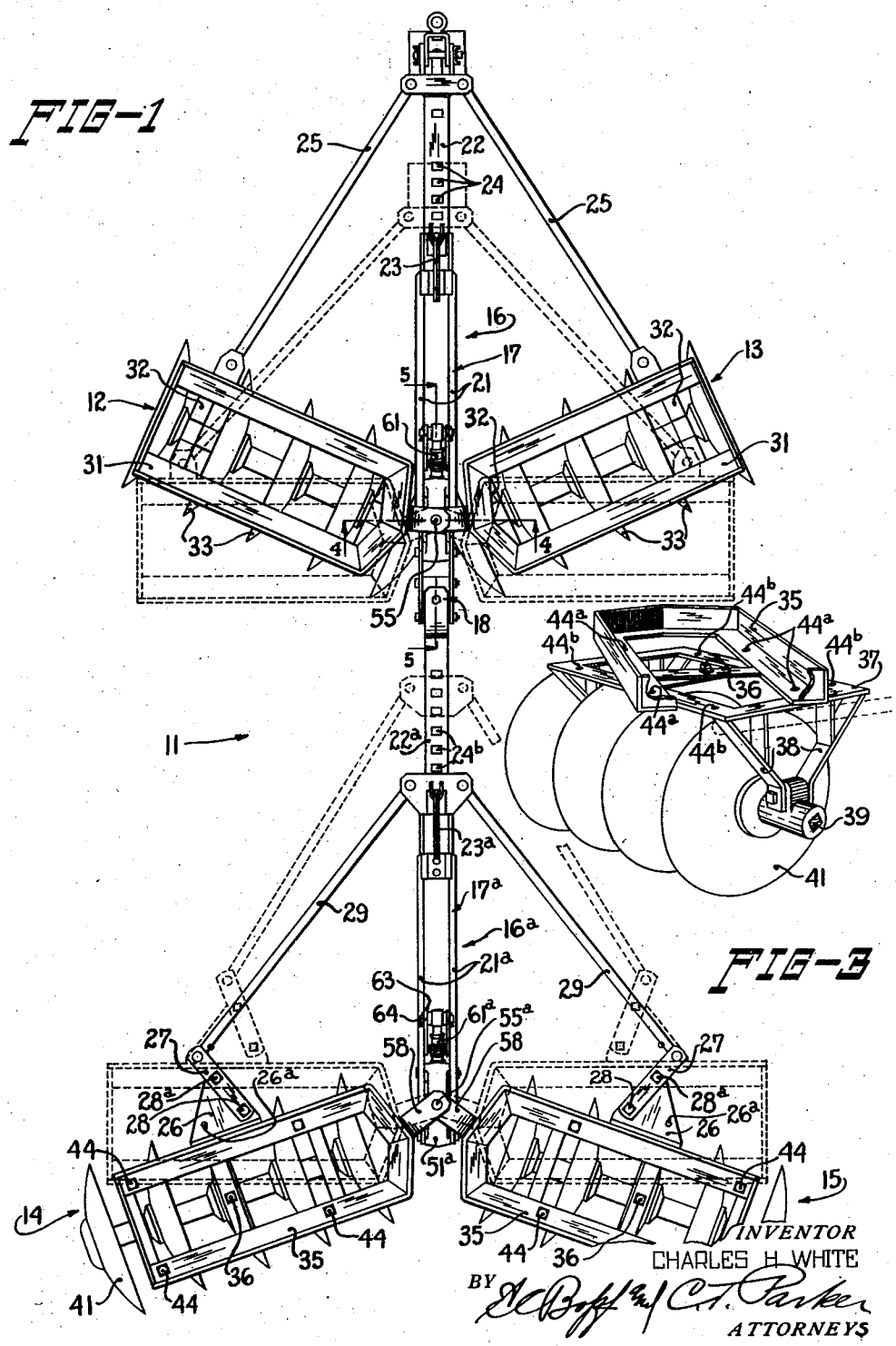

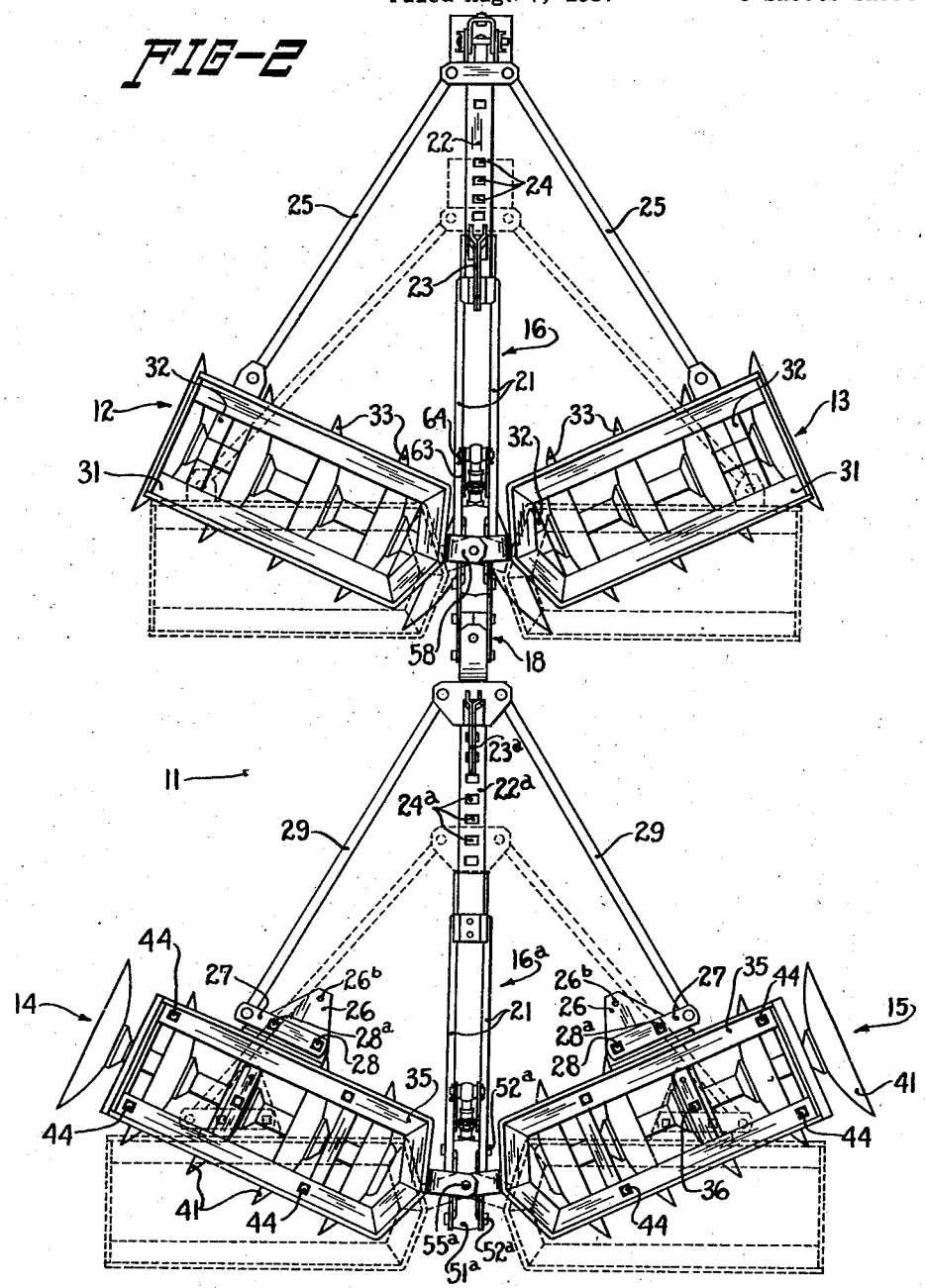

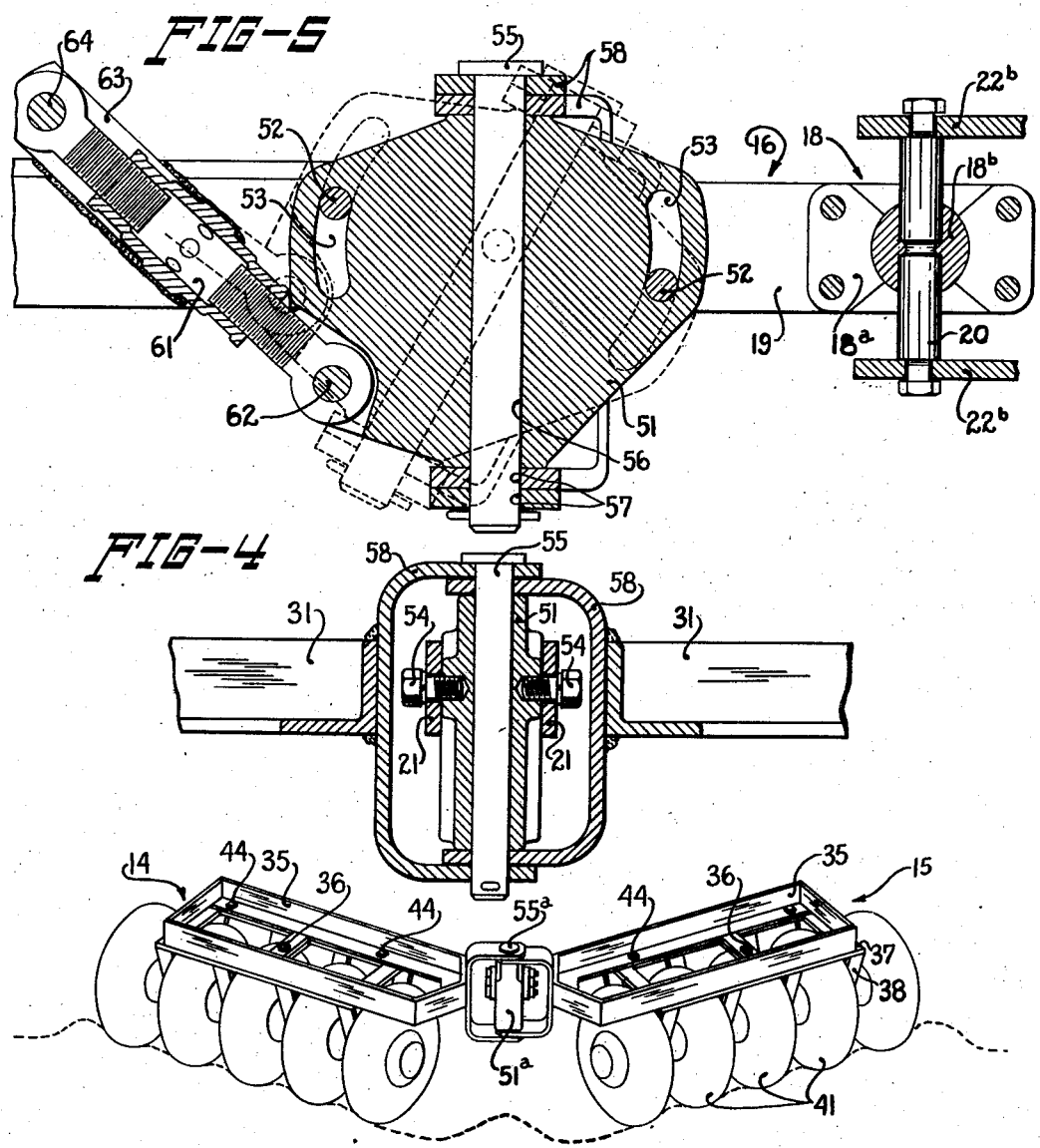

2,163,818

UNITED STATES PATENT OFFICE 2,163,818

DISK HARROW

Charles H. White, Moline, Ill., assignor to Deere & Company, Moline, Ill., a corporation of Illinois Application August 7, 1937, Serial No. 157,900

17 Claims. (Cl. 55—83)

My invention relates generally to disk harrows and more particularly to tandem disk harrows.

In the conventional design of tandem disk harrow the disks on the front gangs are arranged to throw the soil outwardly and the disks on the rear gangs to throw the soil inwardly in order that the field will be maintained in a level condition. I have found that when using a disk harrow in the preparation of terraced land, particularly when cleaning out the water channel of the terraces, it is desirable that the disks of both the front and rear gangs be arranged to throw the soil outwardly and thereby form or restore the channels to their proper depth. I have found further, that it is desirable that the disk gangs be tilted when adjusted in an angled or operating position with the inner ends of the gangs disposed lower than the outer ends, to conform to the sloping sides of the channel.

The object of my invention is to provide a tandem disk harrow wherein the disks of the rear gangs are reversibly mounted so that they may be adjusted to throw the soil inwardly when the harrow is used in ordinary disking on level ground, and may be reversed to throw the soil outwardly when the harrow is to be used to clean out the channels of terraced land.

A further object of the invention is to provide a means for tilting both the front and rear gangs so that the inner ends of the gangs will be disposed on a lower plane than the outer ends, when the gangs are in an operative position.

Other and further objects will appear from the following detailed description of an embodiment of my invention illustrated in the accompanying drawings, in which Figure 1 is a plan view of the disk harrow with the disks of the front and rear gangs arranged to throw the soil in opposite directions and showing in full lines, the gangs in angled or operating position and in dotted lines, in straight or transport position;

Figure 2 is a plan view similar to that shown in Figure 1 but with the disks of the rear gangs reversed to throw the soil outwardly;

Figure 3 is a detail perspective view of one of the rear disk gangs with the near disk removed showing the construction of the frame which permits reversing of the disks;

Figure 4 is an enlarged detail sectional view taken substantially on the plane of line 4—4 of Figure 1;

Figure 5 is a longitudinal detail sectional view on enlarged scale taken substantially on the plane of line 5—5 of Figure 1 and showing, in dotted lines, the position of the parts when the gangs are tilted upwardly for operation on terraced land; and, Figure 6 is a rear view of the rear gangs of the disk harrow in angled and tilted position for cleaning the channel of terraced land.

The main elements of the harrow, indicated in its entirety by the numeral 11, comprise a pair of front gangs 12 and 13, and a pair of rear gangs 14 and 15. The gangs 12 and 13, and 14 and 15 of each pair are disposed substantially abreast of each other in oppositely extending relation with respect to central front and rear telescoping draft devices 16 and 16a, respectively. The draft device 16 comprises a draft frame 17 in the form of a pair of laterally spaced parallel bars 21 disposed at each side of a central telescoping member 22. The draft frame 17 and member 22 are adjustable longitudinally relative to each other to angle or straighten the gangs, and may be secured in any desired position of adjustment by means of a latch 23. Latch 23 is mounted on the forward end of draft frame 17 and is adapted to selectively engage the holes 24 formed in member 22. A pair of draft links 25 converge forwardly from the outer ends of the front gangs 12 and 13 and are connected to the front end of the member 22.

A triangular plate 26 is secured to the front side of each of the rear gangs 14 and 15 and projects forwardly therefrom. An arm 27 is attached to each plate 26 by means of bolts 28 and 28a, one end of the arm extends beyond the edge of the plate 26 to which forwardly converging draft links 29 are pivotally connected. The opposite ends of links are pivotally connected to member 22a of draft device 16a, the construction of which is similar to draft device 16. Arms 27 may be fixed in either of two positions, as represented by the two holes 26a and 26b in plate 26 for bolts 28a. When arms 27 are disposed in their forward position, as shown in Figure 1, the rear gangs will be adjustable from a transport position to a rearwardly angled position, as shown in dotted lines and in full lines, respectively, in the figure. When the arms 27 are in their rearward position, as shown in Figure 2, the rear gangs will be adjustable from a forwardly angled position to a transport position, as shown in full lines and in dotted lines, respectively. The purpose of this will be described presently.

Draft device 17 is connected to draft device 17a for universal movement by a ball and socket connector 18, which comprises two socket members 18a fixed between brackets 19 fixed to and extending rearwardly from the ends of bars 21. A ball 18b cast on a vertically disposed pin 20 is supported by the socket members 18a. A yoke 22b fixed to the forward end of member 22a is pivotally connected to the ends of pin 20.

The front gangs 12 and 13 are of conventional design and are similarly constructed except that one is right hand and the other is left hand. The gangs 12 and 13 each comprise a frame 31 having depending brackets 32 which support the usual gang bolt (not shown) upon which are mounted a plurality of disks 33. As is customary in tandem disk harrows, the disks 33 are arranged to throw the soil outwardly.

The rear gangs 14 and 15 comprise frames 35 to which are attached, adjacent their lower side on pivot bolts 36, sub-frames 37. Each sub-frame 37 is provided with a pair of depending brackets 38 which support a gang bolt 39. A plurality of disks 41 are mounted on the gang bolt 39 in the usual manner. The sub-frame 37 carrying the disks 41, may be swung about the pivot bolt 36 to arrange the disks to throw the soil either inwardly or outwardly. Sub-frame 37 may be locked in either position by bolts 44 which extend through aligned holes 44a and 44b provided in the frame 35 and sub-frame 37.

The inner ends of the front gangs 12 and 13 are connected to the draft frame 17 through the agency of a gang tilting block 51 mounted between the bars 21. It is secured to the bars 21 by bolts 52 which extend through arcuate slots 53 in the block 51 and through aligned holes provided in the bars 21. Trunnion members 54, extending inwardly through holes provided in the bars 21, are screwed into threaded borings in the opposite faces of block 51. The block 51 is connected to the gangs 12 and 13 by means of a vertical pivot bolt 55 which extends through a hole 56 in the block 51 and through holes 57 provided in yoke members 58. The yoke members 58 are welded or otherwise secured on the ends of the frames 31 of the gangs 12 and 13 and project inwardly therefrom into overlapping relation over the block 51. The rear gangs 14 and 15 are connected to draft frames 17a in a similar manner by means of a tilting block 51a and a vertical bolt 55a. Tilting blocks 51 and 51a are adjustable from a vertical position to different tilted positions through an agency of turnbuckles 61 and 61a. Turnbuckle 61 is attached at one end to block 51 by means of a pin 62 and is connected at the opposite end to brackets 63 fixed on the bars 21 of the draft frame 17 by a pin 64. To adjust the block 51 from a vertical to a tilted position, the bolts 52 are loosened and the turnbuckle 61 turned. Turnbuckle 61a is similarly connected between block 51a and bars 21a of draft member 16a.

To arrange the harrow as a conventional tandem harrow for operation on level ground, the sub-frames 37 of the rear gangs are positioned to dispose the disks of the rear gangs to throw inwardly, arms 27 are fixed to brackets 26 in their forward position, and tilting blocks 51 and 51a are adjusted to place the pivot bolts 55, 55a in a vertical position. To arrange the harrow to form and for cleaning out water channels in terraced land, the sub-frames 37 of the rear gangs are reversed to position the disks on the rear gangs to throw outwardly, arms 27 are moved into their forward position on brackets 26, and tilting blocks 51 and 51a are adjusted into tilted positions to cause the outer ends of the gangs, both front and rear, to be held at a higher elevation than the inner ends when the gangs are angled into an operating position.

While I prefer to embody my invention as specifically illustrated and described herein, I wish it to be understood that it is not limited to such specific construction, as it will be apparent that various changes and modifications of such structure may be made without departing from the invention pointed out in the generic claims.

What I claim is:

1. A disk harrow comprising a pair of disk gangs, a normally vertical pivot connecting the inner ends of said gangs, means for adjusting said gangs about said pivot into either aligned or horizontally angled relation for ordinary field disking operation, and means for tilting said pivot for adjusting said gangs into vertically angled relation for bedding or ditching operation.

2. A disk harrow comprising a pair of disk gangs, a telescoping draft member disposed between said gangs and extending forwardly therefrom, a pivot block mounted on said draft member and connecting the inner ends of said gangs, draft links extending between said gangs and said draft member, means for locking said draft member in either a telescoped or extended position to adjust said gangs in aligned or angled relation, and means for tilting said pivot block to adjust the outer ends of said gangs upwardly when said gangs are arranged in angled position.

3. In a disk harrow, a draft frame, a pair of disk gangs, means connecting said gangs to said draft member for swinging relative to said draft member, a draft bar movable relative to said draft frame between two certain positions, draft links connected to said draft bar, and means connecting said draft links to said gangs whereby movement of said draft bar from one position to the other moves said gangs from a transport position to a forwardly angled position, said connecting means being adjustable to a position wherein the aforesaid movement of said draft bar moves said gangs from a rearwardly angled position to a transport position.

4. In a disk harrow having at least one gang of disks, a draft means therefor, pivot means for connecting said disc gang with said draft means and providing for angular adjustment of said gang relative to said draft means, and means for adjustably fixing said pivot means in a vertical position to provide for horizontal angular adjustment of said gang, or in an inclined position to provide for angular adjustment of said gang in a plane disposed at an acute angle to the horizontal, for level disking or for bedding operations, respectively.

5. A disk harrow comprising a pair of disk gangs, pivot means for connecting said gangs together for angular swinging movement, draft means, and means for connecting said draft means with said gangs, said connecting means being adapted for adjusting the angle of said pivot means for operation either in a vertical position for level disking or in a position inclined from the vertical for bedding operation and the like.

6. A disk harrow comprising a pair of disk gangs connected together on a single pivot axis for angular swinging movement with respect to each other, draft means, and means for connecting said draft means with said gangs including means for adjustably setting the angle between said pivot axis and said draft means for operation either in a position perpendicular to the ground for ordinary harrowing operation, or in an inclined position in which the relative angular movement of said gangs is in a plane disposed at an acute angle with the ground for other ground working operations.

7. In a disk harrow having at least one disk gang, draft means therefor, a tilting block, pivot means for connecting said tilting block with said draft member, and pivot means for connecting said tilting block with said disk gang, said pivot means establishing two axes intersecting at right angles about each of which said gang is adjustable relative to said draft means, and means for fixing said gang with respect to said draft means in adjusted position.

8. In a disk harrow having at least one disk gang, draft means therefor, a tilting block, a normally vertically disposed pivot member connecting said gang with said tilting block, and pivot means for connecting said tilting block with said draft member for swinging movement of said block about a normally horizontal axis passing through said normally vertically disposed pivot member.

9. A disk harrow comprising a pair of disk gangs, draft means therefor, a tilting block, means for connecting each of said gangs to said tilting block for swinging movement about a common axis, and means for connecting said tilting block with said draft means for pivotal movement about an axis substantially intersecting said common axis and substantially perpendicular thereto, and means for fixing said gangs in adjusted position.

10. A disk harrow comprising a pair of disk gangs, a hitch device including a pair of relatively movable draft members, a pivot block mounted on one of said members and connecting the inner ends of said gangs, means interconnecting the other of said draft members with each of the gangs, means for adjustably locking said draft members together in any of several positions relative to each other to adjust said gangs in angled or transport positions, and means for tilting said pivot block to adjust the outer ends of the gangs vertically relative to the inner ends thereof when said gangs are in angled position.

11. A disk harrow comprising a pair of disk gangs, a hitch device including a pair of co-operative draft members movable longitudinally relative to each other, a pivot block mounted on one of said members, means pivotally connecting each of said disk gangs to said block for swinging movement in a common plane, means interconnecting the other of said draft members with each of said gangs, means for adjustably locking said draft members together in any of several positions relative to each other to adjust said gangs angularly in said common plane, and means for tilting said pivot block relative to said hitch device to adjust the inclination of said common plane of angular adjustment.

12. In a disk harrow, a gang of concavo-convex disks connected together by a gang bolt, a gang frame, means for pivotally connecting said gang with said frame for rotation of said gang relative to said frame about a vertical axis at least 180°, draft means, means for pivotally connecting said frame with said draft means for angling movement between transport position and ground working position relative thereto, and means for tilting said last named pivotal connecting means relative to said draft means.

13. In a disk harrow, a draft member, a pair of disk gangs, and means for pivotally connecting said gangs with said draft member for angling movement between transport position and ground working position, each of said gangs including a main frame, a sub-frame, a plurality of disks mounted on said sub-frame, and vertically disposed pivot means connecting said sub-frame with said main frame for rolling movement on the ground through an angle of at least 180°, for optionally setting said gang to throw inwardly or outwardly, and means for tilting the first named pivotal connecting means to adjust the angular relation between the plane of angling movement of said gangs and the ground.

14. In a disk harrow, a gang of concavo-convex disks connected together by a gang bolt, a sub-frame on which said disks are journaled, a main frame, means pivotally connecting said sub-frame with said main frame for rotation in a generally horizontal plane for setting said discs to throw earth in either direction, selectively, draft means, means pivotally connecting said main frame with said draft means for adjusting the angle of said gang relative to the line of advance, and means for tilting the axis of the last-named pivot means for adjusting the plane of movement of said gang.

15. In a disk harrow, a gang of concavo-convex disks connected together by a gang bolt, a gang frame, means for pivotally connecting said gang with said frame for rotation about a generally vertical axis disposed intermediate of the ends of said gang, a draft member, means for pivotally connecting said frame with said member for movement about a generally vertical axis disposed adjacent one end of said disk gang, and means for adjusting the last mentioned axis, a limited amount from the vertical.

16. In a disk harrow, a pair of disk gangs pivotable relative to each other in a common plane between angled and axially aligned positions, draft means therefor, each of said disk gangs including a set of concavo-convex disks connected together by means serving as a gang bolt, pivot means for rotating each of said sets of disks independently through at least 180° in planes substantially parallel to said common plane of angling movement, and means for adjusting the angular relation between said common plane and the ground.

17. In a disk harrow, a pair of disk gangs, pivot means connecting said gangs for angling movement about a common axis, each of the disk gangs including a set of concavo-convex disks, and individual pivot means for each of said sets of disks, providing for rotation of each of said sets about axes substantially parallel to said common axis of angling movement, draft means connected with said gangs, and means for adjustably setting said first named pivot means in different angular positions relative to said draft means.

CHARLES H. WHITE.